(12) United States Patent
Montero et al.

(10) Patent No.: US 10,303,273 B2
(45) Date of Patent: *May 28, 2019

(54) SYSTEM AND METHOD OF SUPPORTING A POINTING DEVICE

(71) Applicant: Dell Products L.P., Round Rock, TX (US)

(72) Inventors: Adolfo S. Montero, Pflugerville, TX (US); Louis M. Davis, Austin, TX (US); George Mathew, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/188,826

(22) Filed: Nov. 13, 2018

(65) Prior Publication Data

US 2019/0079596 A1    Mar. 14, 2019

Related U.S. Application Data

(63) Continuation of application No. 15/391,571, filed on Dec. 27, 2016, now Pat. No. 10,162,437.

(51) Int. Cl.
*G06F 3/038* (2013.01)
*G06F 1/16* (2006.01)
(Continued)

(52) U.S. Cl.
CPC .............. *G06F 3/038* (2013.01); *G06F 1/169* (2013.01); *G06F 3/03547* (2013.01); *G06F 13/4282* (2013.01); *G06F 2213/0016* (2013.01)

(58) Field of Classification Search
CPC ......... G09G 3/2003; G09G 2320/0666; G09G 2320/0242; G09G 2360/144; G09G 2360/145; H04N 1/6094
See application file for complete search history.

(56) References Cited

U.S. PATENT DOCUMENTS 5,922,075 A * 7/1999 Bowker ................ G06F 1/3215
713/300
9,916,021 B2    3/2018 Montero et al.
(Continued)

OTHER PUBLICATIONS

Claude Haridge's "Parsing Keyboard Commands and Data Using the E1115B," Locus Engineering Inc., Dec. 11, 2014, 10 pages.
(Continued)

*Primary Examiner* — Priyank J Shah
(74) *Attorney, Agent, or Firm* — Baker Botts L.L.P.

(57) ABSTRACT

In one or more embodiments, an information handling system may be communicatively coupled to a pointing device that communicates interaction data via a first bus via a first data format and may include a controller that receives the interaction data via the first bus and transforms the interaction data into a second data format and communicates the interaction data to a second bus via the second data format. If a status of a resource associated with the pointing device is queried, the controller may be instructed to cease transforming the interaction data from the pointing device, permitting another device to receive the interaction data and provide the interaction data to a processor of the information handling system. As the other device receives the interaction data and provides the interaction data to the processor, additional and/or full functionality of the pointing device may be realized and/or accomplished.

20 Claims, 4 Drawing Sheets

(51) Int. Cl.
*G06F 3/0354* (2013.01)
*G06F 13/42* (2006.01)

(56) References Cited

U.S. PATENT DOCUMENTS

2007/0257892 A1* 11/2007 Hu .................. G06F 3/0416
   345/173
2017/0031464 A1* 2/2017 Montero .............. G06F 3/038

OTHER PUBLICATIONS

"UM10204: I2C-bus specification and user manual," Rev. 6, NXP Semiconductors, Apr. 4, 2014, 64 pages.
"Advanced Configuration and Power Interface Specification" Hewlett-Packard Corporation et al., Dec. 6, 2011, Version 5.0, 958 pages.
"Keyboard and Auxiliary Device Controller", IBM Corp. Oct. 1990, 20 pages.
"PS/2 Keyboard to ASCII Converter", Locus Engineering, Inc., E1115B, Dec. 11, 2014, 12 pages.
Matthew Lee's, "White Paper: Embedded Controller Usage in Low Power Embedded Designs", Intel Corporation, Sep. 2011, 19 pages.
"Keyboard and Embedded Controller Products for Notebook PC", Microchip Technology, Inc., MEC140x/lx, Jun. 23, 2016, 571 pages.
"System Management Bus (SMBus) Specification", SMI System Management Interface Forum, Inc., Version 3.0, Dec. 20, 2014, 85 pages.

\* cited by examiner

SYSTEM AND METHOD OF SUPPORTING A POINTING DEVICE

PRIORITY CLAIM

This application claims priority to and is a continuation of U.S. patent application Ser. No. 15/391,571, filed 27 Dec. 2016, and titled "SYSTEM AND METHOD OF SUPPORTING A POINTING DEVICE", which is hereby incorporated by reference herein.

BACKGROUND

Field of the Disclosure

This disclosure relates generally to information handling systems and more particularly to pointing device interactions with information handling systems.

Description of the Related Art

Some information handling systems may accept end user inputs as touches made via a pointing device and presented on a display. A pointing device may be a touchpad, trackpad, or touchscreen that presents one or more tactile sensors, where a user can touch and/or drag one or more digits across a surface of the touchpad, which can be translated to a position that is provided to an application and/or outputted via a display. A touchpad is a common feature of a mobile information handling system, such as a laptop computer, and can be utilized as a substitute for a mouse. As touchpads can vary in size, they may also be found on personal digital assistants (PDAs). Touchpads may operate in various ways. In one example, a touchpad may operate via a resistive screen, such as a touchscreen. In another example, a touchpad may operate via one or more capacitive sensing systems and/or methods.

As with most devices associated with an information handling system, a device driver may be utilized to interface with one or more of the devices associated with the information handling system. However, a specific device driver might not be available for utilization with a specific device. This lack of driver availability may render the specific device useless or impaired in one or more system-contexts.

SUMMARY

In one or more embodiments, an information handling system may include and/or be communicatively coupled to a pointing device (e.g., a touchpad, a mouse, a trackball, a touchscreen, etc.) and an embedded controller that receives, via a first bus (e.g., an inter-integrated circuit ($I^2C$) bus, a serial peripheral interconnect (SPI) bus, etc.), interaction data associated with the pointing device, transforms the interaction data from a first data format into a second data format, and provides the interaction data to a second bus (e.g., a low pin count (LPC) bus, an enhanced serial peripheral interconnect (eSPI), etc.) via the second data format. For example, the second data format may be or include a PS/2 format. The information handling system may load at least a portion of an operating system, query at least one resource associated with the pointing device, and provide embedded controller configuration information to the embedded controller, in response to querying the at least one resource associated with the pointing device. The embedded controller may cease to provide the interaction data to the second bus and/or may cease operating as a bus master of the first bus, in response to and/or based on the embedded controller configuration information.

In one or more embodiments, the information handling system may provide platform controller hub configuration information to a platform controller hub (PCH) in response to querying the at least one resource associated with the touchpad. The PCH may become a bus master of the first bus in response to and/or based on the platform controller hub configuration information. The PCH may receive, via the first bus, additional interaction data associated with the pointing device and may provide the additional interaction data to a processor of the information handling system.

In one or more embodiments, the embedded controller may receive, via the first bus, additional interaction data associated with the pointing device, may determine that the additional interaction data cannot be transformed into the second data format, and may drop the additional interaction data. For example, the additional interaction data may include gesture information that cannot be transformed into the second data format. For instance, the gesture information may include pinch-to-zoom gesture information that cannot be transformed into the PS/2 data format, and the embedded controller may drop the pinch-to-zoom gesture information.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
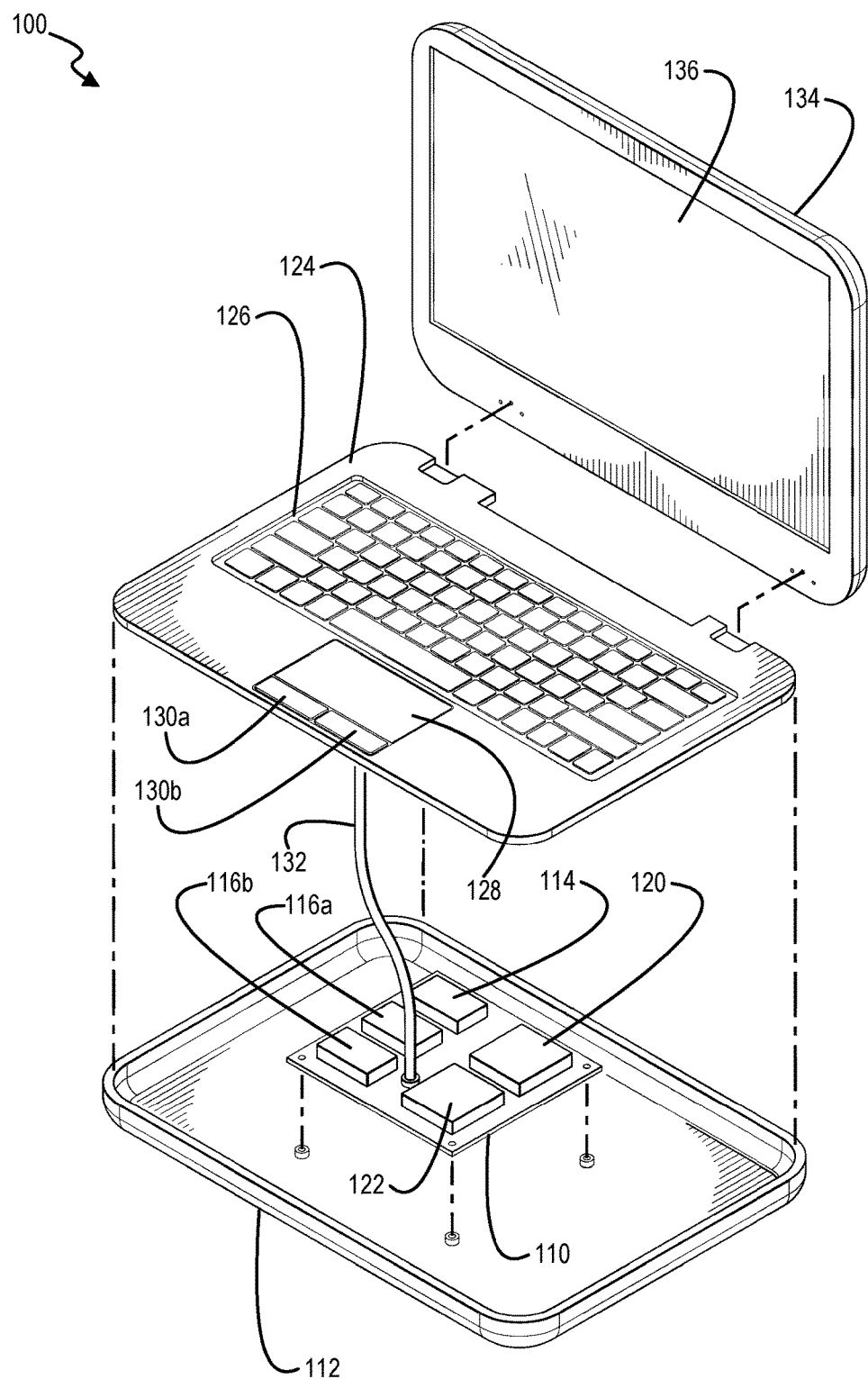
FIG. 1 illustrates an exploded view of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12a' refers to an instance of a device class, which may be referred to collectively as devices '12' and any one of which may be referred to generically as a device '12'.

In one or more embodiments, an information handling system may include a pointing device (e.g., a touchpad, a mouse, a trackball, a touchscreen, etc.) that may need and/or require specific processor instructions that may not be available. For example, this lack of availability may render the pointing device useless or impaired in one or more contexts. In one instance, a device driver that includes processor instructions that enable a processor to receive and/or process interaction data from the pointing device may not be included in an operating system (OS). In a second instance, the device driver may not be loaded in the OS. In another example, the processor instructions that may be utilized to receive and/or process interaction data from the pointing device may not have been created and/or implemented.

In one or more embodiments, a device driver for the pointing device may not be available, may not have ever been created and/or implemented or may not have been created and/or implemented for one or more of a specific processor, a specific OS, and a specific version of an OS, among others. For example, the OS may include a Microsoft Windows OS (e.g., Windows XP, Windows 7, Windows 8, Windows 10, etc.), a Linux OS (Ubuntu, Debian, Red Hat, CentOS, etc.), a BSD OS (e.g., FreeBSD, NetBSD, OpenBSD, etc.), an Android OS (e.g., Ice Cream Sandwich, Jellybean, Lollipop, Marshmallow, etc.), a Minix OS (e.g., Minix 1, Minix 2, Minix 3, etc.), a FreeRTOS OS, and a QNX OS, among others.

In one or more embodiments, a device driver or a "driver" includes instructions, executable via a processor, that interfaces with, operates, and/or controls a device that may be communicatively coupled to an information handling system. For example, a device driver may provide a software and/or operating system interface to one or more hardware devices, enabling the software and/or operating system to access hardware functionality of the one or more devices. In one or more embodiments, a device driver may communicate with the one or more devices via a communications bus and/or a communications subsystem to which the one or more devices may be communicatively coupled. For example, a calling subroutine (e.g., instructions executable via a processor) invokes and/or instantiates a routine in the device driver, the device driver may issue and/or provide one or more commands and/or instructions to the one or more devices. For instance, the device driver, based on the one or more commands and/or instructions, may invoke and/or instantiate functionality of the one or more device and/or retrieve information from the one or more devices.

In one or more embodiments, the device driver may provide interrupt handling of asynchronous and/or time-dependent one or more hardware interfaces and/or one or more devices. For example, in response to an interrupt, the device driver may automatically retrieve data from one or more devices and provide the data from the one or more devices to an OS. In one instance, the device driver may provide the data from the one or more devices to one or more queues of the OS. In another instance, the device driver may query and/or retrieve data from a touchpad and provide availability of the data to programs that utilize pointer functionality.

In one or more embodiments, an OS may include a device driver. For example, the device driver may be included in the OS when the OS is compiled. In one or more embodiments, an OS may load a device driver. For example, the device driver may not be included in the OS when the OS is compiled but loaded after at least a portion of the OS is executed via a processor. For instance, the device driver may be, include, or be included in a kernel loadable module.

In one or more embodiments, processor instructions and/or hardware may be utilized to receive and/or process interaction data from a device different from the pointing device or a device similar to the pointing device utilizing data and/or a protocol different from that utilized by the pointing device. For example, the processor instructions and/or hardware that may be utilized to receive and/or process interaction data from the different device or the similar device utilizing the data and/or the protocol different from that utilized by the pointing device may include processor instructions and/or hardware may be utilized to receive and/or process interaction data associated with a PS/2 interface and/or device. For instance, the processor instructions may include a device driver that may be utilized to receive and/or process interaction data associated with a PS/2 interface and/or device, and a hardware device may provide interaction data of the pointing device to the processor via interaction data associated with a PS/2 interface and/or device. Further, data from any pointing device may be translated to a PS/2 format for compatibility with older operating system that may not support new device hardware specifics, for instance.

In one or more embodiments, an embedded controller may receive interaction data associated with the pointing device, may transform the interaction data from a first data format into a second data format, and may provide the interaction data via the second data format. For example, the second data format may be or include a PS/2 format. In one or more embodiments, at least one resource associated with the pointing device may be queried. For example, a device driver associated with the pointing device may query at least one resource associated with the pointing device, and in response to the query, embedded controller configuration information may be provided to the embedded controller. In one or more embodiments, the embedded controller may cease to provide the interaction data via the second data format. For example, the query may indicate that the device driver will be utilized and/or may indicate that the embedded controller may no longer be required and/or needed to utilize the pointing device, as the device driver and/or other information handling system components will interface and/or interact with the pointing device.

Referring now to FIG. 1, an exploded view illustrates an information handling system 100, according to one or more embodiments. As shown, information handling system 100 may include a motherboard 110 and a chassis 112 that may hold motherboard 110. As illustrated, motherboard 110 may include processing components. In one or more embodiments, the processing components may include a processor 114, a storage 116, a chipset 120, and an interface system 122, among others, and processing components 116-122 may be communicatively coupled to processor 114.

As shown, information handling system 100 may include an upper housing surface 124 that may integrate one or more of a keyboard 126 and a touchpad 128. In one or more embodiments, a touchpad 128 may include and/or be associated with one or more push buttons 130. As illustrated, information handling system 100 may include a coupling 132 that may communicatively couple and/or interface one or more of keyboard 126, touchpad 128, and buttons 130 with one or more of motherboard 110 and information handling system components 114-122. As shown, a lid 134 may rotationally couple to chassis 120 and may integrate a display 136.

In one or more embodiments, storage 116 may include volatile and persistent storage media, fixed and removable media, and magnetic and semiconductor media, among others. In one example, storage 116 may include storage media such as non-transitory computer-readable media that stores, for at least a period of time, data and instructions, such as executable code. In another example, storage 116 may include storage media such as a direct access storage device, including a hard disk drive, a sequential access storage device, such as flash memory, electrically erasable programmable read-only memory (EEPROM), a tape disk drive, compact disk (CD), random access memory (RAM), read-only memory (ROM), CD-ROM, digital versatile disc (DVD), and non-transitory media, among others, and/or one or more combinations of the foregoing.

In one or more embodiments, storage 116 may include processor instructions executable by processor 114. For example, processor 114 may execute the processor instructions to implement one or more systems, processes, and/or methods described herein. For instance, the processor instructions may be configured, coded, and/or encoded with instructions in accordance with one or more of flowcharts, methods, and/or processes described herein. In one or more embodiments, one or more of a storage medium and a memory medium may be or include a software product, a program product, and/or an article of manufacture. For example, the software product, the program product, and/or the article of manufacture may be configured, coded, and/or encoded with instructions, executable by a processor, in accordance with one or more of flowcharts, methods, and/or processes described herein.

In one or more embodiments, processor instructions may be utilized to receive and/or process interaction data from touchpad 128. For example, a device driver may be utilized to receive and/or process interaction data from touchpad 128. In one instance, the device driver may be included in an OS. In another instance, the device driver may be loaded into the OS. In one or more embodiments, processor instructions may not be available to receive and/or process interaction data from touchpad 128. In one example, a device driver may not be included in an OS. In a second example, the device driver may not be loaded in the OS. In another example, the processor instructions that may be utilized to receive and/or process interaction data from touchpad 128 may not have been created and/or implemented. For instance, the processor instructions that may be utilized to receive and/or process interaction data from touchpad 128 may not have ever been created and/or implemented or may not have been created and/or implemented for one or more of a specific processor, a specific OS, and a specific version of an OS, among others.

In one or more embodiments, processor instructions and/or hardware may be utilized to receive and/or process interaction data from a device different from touchpad 128 or a device similar to touchpad 128 utilizing data and/or a protocol different from that utilized by touchpad 128. For example, the processor instructions and/or hardware that may be utilized to receive and/or process interaction data from the different device or the similar device utilizing the data and/or the protocol different from that utilized by touchpad 128 may include processor instructions and/or hardware may be utilized to receive and/or process interaction data associated with a PS/2 interface and/or device. For instance, the processor instructions may include a device driver that may be utilized to receive and/or process interaction data associated with a PS/2 interface and/or device, and a hardware device may provide interaction data of touchpad 128 to processor 114 via interaction data associated with a PS/2 interface and/or device.

In one or more embodiments, touchpad 128 may utilize a data format (e.g., a communication protocol) that may be utilized to encode and/or convey to another device that may interact with touchpad 128. For example, touchpad 128 may sense interaction, may transform the interaction into interaction data, and may utilize the data format to encode and/or convey the interaction data. In one instance, touchpad 128 may sense interaction, transform the interaction into horizontal and vertical (e.g., X/Y) data, and utilize the data format to encode and/or convey the interaction data. In a second instance, touchpad 128 may sense interaction, transform the interaction into scroll (e.g., scroll left, scroll right, scroll up, scroll down, etc.) data, and utilize the communication protocol to encode and/or convey the scroll data. In a third instance, touchpad 128 may sense interaction, transform the interaction into zoom (e.g., zoom-in, zoom-out, etc.) data, and utilize the data format to encode and/or convey the zoom data. In another instance, touchpad 128 may sense interaction, transform the interaction into rotate (e.g., rotate clockwise, rotate counterclockwise, etc.) data, and utilize the data format to encode and/or convey the rotate data. In one or more embodiments, touchpad 128 may sense interaction, transform the interaction into data associated with another gesture, and utilize the data format to encode and/or convey the other gesture data.

Although information handing system 100 illustrated in FIG. 1 provides an exemplary information handing system, an information handling system may include an hardware resource or aggregate of hardware resources operable to compute, classify, process, transmit, receive, retrieve, originate, switch, store, display, manifest, detect, record, reproduce, handle, or utilize various forms of information, intelligence, or data for business, scientific, control, entertainment, or other purposes, according to one or more embodiments. For example, the information handling system may be a personal computer, a personal digital assistant (PDA), a consumer electronic device, an electronic music player, an electronic camera, an electronic video player, a network storage device, or another suitable device and may vary in size, shape, performance, functionality, and price. The information handling system may include memory, one or more processing resources such as a processor or hardware or software control logic. Additional components of the information handling system may include one or more storage devices, one or more communications ports for communicating with external devices as well as various input and output (I/O) devices, such as a keyboard, a mouse, and a video display, among others. The information handling system may also include one or more buses operable to transmit communication between the various hardware components.

In one or more embodiments, the information handling system may include firmware for controlling or communicating with, for example, hard drives, network circuitry, memory devices, I/O devices, and other peripheral devices. For example, firmware may include software embedded in an information handling system component used to perform tasks. In one or more embodiments, firmware may be stored in non-volatile memory, or storage that does not lose stored data upon the loss of power. In one example, firmware associated with an information handling system component may be stored in non-volatile memory that is accessible to one or more information handling system components. In another example, firmware associated with an information handling system component may be stored in non-volatile memory that may be dedicated to and includes part of that component. For example, an embedded controller may include firmware that may be stored via non-volatile memory that may be dedicated to and includes part of the embedded controller.

Figure 2:
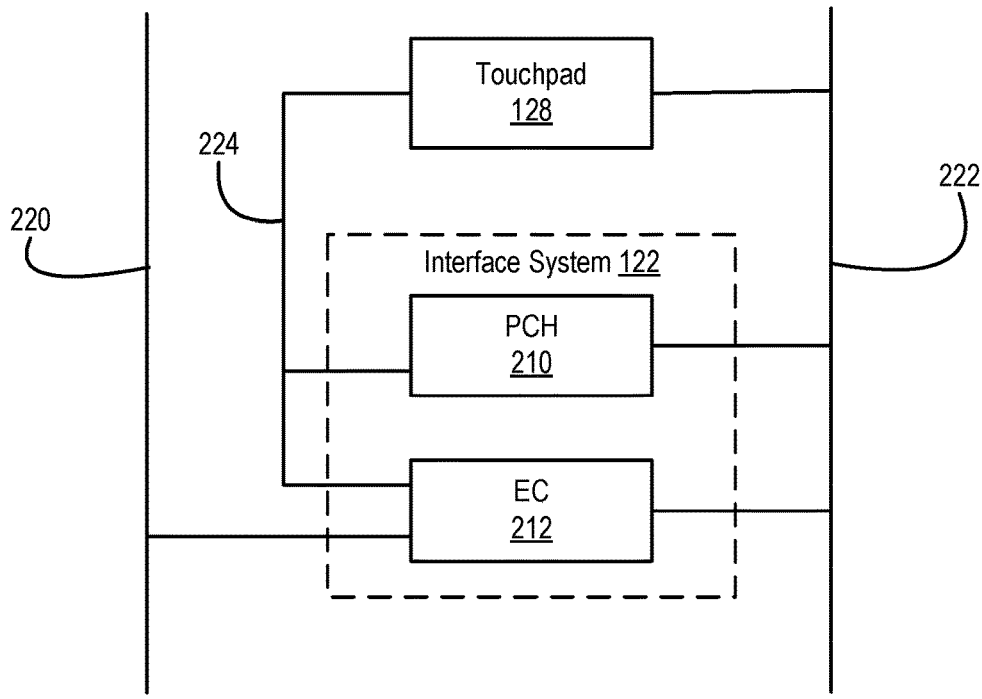
FIG. 2 provides a schematic block diagram of a portion of an information handling system, according to one or more embodiments.

Turning now to FIG. 2, a schematic block diagram of a portion of an information handling system is illustrated, according to one or more embodiments. As shown, interface system 122 may include a platform controller hub (PCH) 210 and an embedded controller (EC) 212. As illustrated, EC 212 may be communicatively coupled to bus 220, and PCH 210, EC 212, and touchpad 128 may be communicatively coupled to a bus 222. As shown, touchpad 128 may be communicatively coupled to PCH 210 and EC 212 via an interrupt line 224. For instance, touchpad 128 may signal one or more of PCH 210 and EC 212 via interrupt line 224 when interaction data is available via bus 222.

In one or more embodiments, buses 220 and 222 may be or include different respective busses. In one example, bus 220 may be or include a low pint count (LPC) bus. In a second example, bus 220 may be or include an enhanced serial peripheral interconnect (eSPI) bus. In a third example, bus 222 may be or include an inter-integrated circuit (I²C) bus. In a fourth example, bus 222 may be or include a serial peripheral interconnect (SPI) bus. In another example, bus 222 may be or include a system management bus (SMBus).

In one or more embodiments, EC 212 may receive interaction data of touchpad 128 via bus 222 and provide the interaction data, one or more portions of the interaction data, or a transformation of the interaction data to processor 114 via bus 220. For example, EC 212 may provide interaction data of touchpad 128 to processor 114 via interaction data associated with a PS/2 interface and/or device. In one instance, EC 212 may provide interaction data of touchpad 128 to processor 114 as if touchpad 128 was a PS/2 device. In another instance, EC 212 may provide a virtual PS/2 device to processor 114 based on interaction data of touchpad 128.

Figure 3:
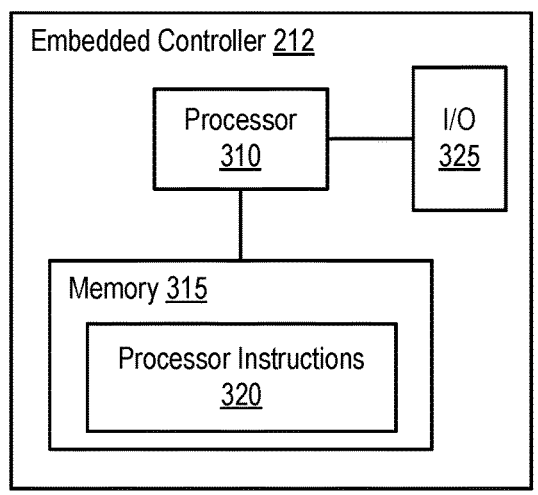
FIG. 3 provides a block diagram of an embedded controller, according to one or more embodiments.

Turning now to FIG. 3, a block diagram of an embedded controller is illustrated, according to one or more embodiments. As shown, EC 212 may include a processor 310, memory 315, and I/O 325, where memory 320 and I/O 325 may be communicatively coupled to processor 310. As illustrated, memory 315 may store processor instructions 320.

In one or more embodiments, processor 310 may execute processor instructions 320 to implement one or more systems, processes, and/or methods described herein. For example, processor instructions 320 may be configured, coded, and/or encoded with instructions in accordance with one or more of flowcharts, methods, and/or processes described herein. In one or more embodiments, memory 315 may be or include a software product, a program product, and/or an article of manufacture. For example, the software product, the program product, and/or the article of manufacture may be configured, coded, and/or encoded with instructions, executable by a processor, in accordance with one or more of flowcharts, methods, and/or processes described herein.

Memory 315 may include volatile and persistent storage media, according to one or more embodiments. In one example, memory 315 may include storage media such as non-transitory processor-readable media that stores, for at least a period of time, data and instructions, such as executable code. In another example, memory 315 may include storage media such as a direct access storage device, a sequential access storage device, such as flash memory, electrically EEPROM, RAM, ROM, and non-transitory memory media, among others, and/or one or more combinations of the foregoing.

In one or more embodiments, EC 212 may be communicatively coupled to one or more of bus 220, bus 222, and interrupt line 224, among others, via I/O 325. In one example, I/O 325 may include circuitry that enables communicatively coupling to one or more buses. For instance, the one or more buses may include one or more of a LPC bus, an eSPI bus, a SPI bus, and an I²C bus, among others. In another example, I/O 325 may include circuitry that enables one or more interrupt signals to be received. For instance, I/O 325 may include general purpose input/output (GPIO) circuitry, and the GPIO circuitry may enable one or more interrupt signals to be received via interrupt line 224.

Utilizing these features, EC 212 may receive, from touchpad 128, a signal that indicates that the interaction data is available, according to one or more embodiments. For example, EC 212 may receive an interrupt signal from touchpad 128 via I/O 325 and interrupt line 224, may query touchpad 128 for interaction data via I/O 325 and bus 222, may receive the interaction data via I/O 325 and bus 222, may process the interaction data via processor 310, and may provide interaction data of touchpad 128 to processor 114 via I/O 325 and bus 220, according to one or more embodiments. For instance, EC 212 may process the interaction data of touchpad 128 and may provide the processed interaction data of touchpad 128 to processor 114 via interaction data associated with a PS/2 interface and/or device.

In one or more embodiments, EC 212 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 212 may be or include a field programmable gate array (FPGA).

Figure 4:
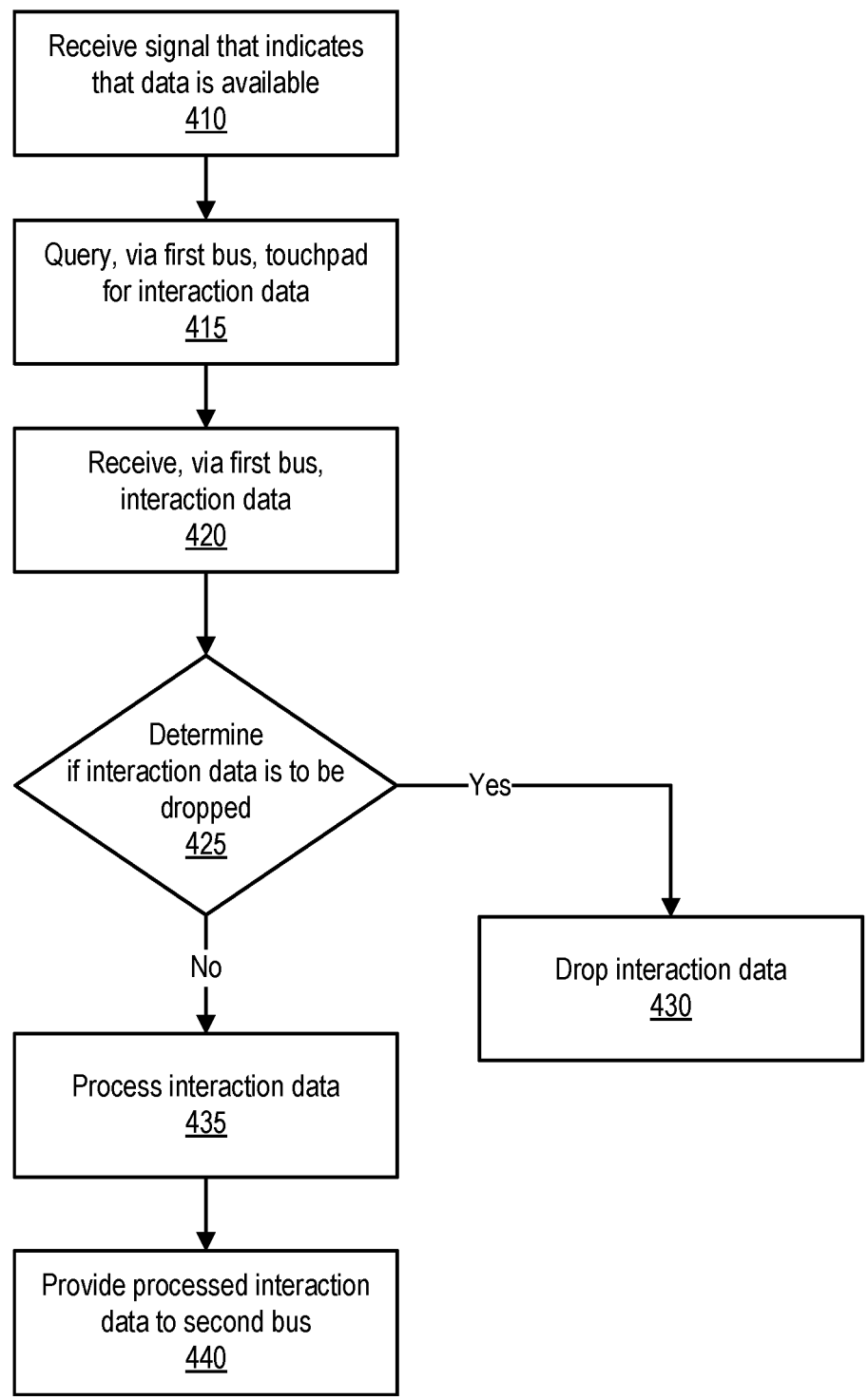
FIG. 4 illustrates a method of operating an embedded controller, according to one or more embodiments.

Turning now to FIG. 4, a method of operating an embedded controller is illustrated, according to one or more embodiments. At step 410, EC 212 may receive a signal that indicates that data associated with touchpad 128 is available via a first bus. For example, the first bus may be or include bus 222. For instance, touchpad 128 may have generated and/or provided an interrupt signal to indicate that interaction data is available via bus 222, and EC 212 may receive the interrupt signal as the signal that indicates that data associated with touchpad 128 is available via the first bus. In one or more embodiments, the signal that indicates that data associated with touchpad 128 is available via the first bus may be provided and/or received via interrupt line 224.

At step 415, EC 212 may query, via the first bus, touchpad 128 for the interaction data. In one or more embodiments, the query may include an address. For example, a protocol associated with bus 222 may include utilization of one or more addresses. For instance, the query may include and/or be associated with an address that is associated with touchpad 128. In one or more embodiments, the query may include one or more storage identifiers. For example, the one or more storage identifiers may include one or more register identifiers and/or may be utilized to retrieve the interaction data. For instance, the one or more register identifiers may include one or more addresses and/or numbers associated with one or more registers of touchpad 128 that store the interaction data.

At step 420, EC 212 may receive, via the first bus, the interaction data. For example, touchpad 128 may provide the interaction data to the first bus, and EC 212 may receive the interaction data from touchpad 128, via the first bus. In one or more embodiments, the interaction data may include data associated with the one or more storage identifiers of the query. For example, the interaction data may include data associated with one or more registers of touchpad 128. In one or more embodiments, the interaction data may include and/or may be of a first data format.

At step 425, EC 212 may determine if the interaction data from touchpad 128 is to be dropped. In one or more embodiments, determining if the interaction data from touchpad 128 is to be dropped may include determining if a device driver is operable to receive the interaction data from touchpad 128. If the device driver is not operable to receive the interaction data from touchpad 128, EC 212 may drop the interaction data from touchpad 128, at step 430. In one example, dropping the interaction data from touchpad 128 may include discarding the interaction data from touchpad 128 and/or not processing the interaction data from touchpad 128. In another example, dropping the interaction data from touchpad 128 may include ignoring the interaction data from touchpad 128 and/or not processing the interaction data from touchpad 128. In one or more embodiments, dropping the interaction data from touchpad 128 may include not providing data, based on the received interaction data, to bus 220 if a device driver is not operable to receive the interaction data from touchpad 128.

In one or more embodiments, determining if the interaction data from touchpad 128 is to be dropped may include determining if the interaction data from touchpad 128 can be transformed into a second data format. For example, EC 212 may determine if the interaction data from touchpad 128 can be transformed into a second data format. For instance, the second data format may include a PS/2 data format, and EC 212 may determine if the interaction data from touchpad 128 can be transformed into the PS/2 data format. In one or more embodiments, the PS/2 data format may permit and/or provide data associated with a PS/2 interface and/or device.

If data from touchpad 128 cannot be transformed, EC 212 may drop the interaction data from touchpad 128, at step 430. In one example, dropping the interaction data from touchpad 128 may include discarding the interaction data from touchpad 128 and/or not processing the interaction data from touchpad 128. In another example, dropping the interaction data from touchpad 128 may include ignoring the interaction data from touchpad 128 and/or not processing the interaction data from touchpad 128. In one or more embodiments, dropping the interaction data from touchpad 128 may include not providing data, based on the received interaction data, to bus 220 if the data from touchpad 128 cannot be transformed. For example, if the data from touchpad 128 cannot be transformed into PS/2 data, the data from touchpad 128 may be dropped.

If data from touchpad 128 is not to be dropped, EC 212 may process the interaction data, at step 435. In one example, EC 212 may process the interaction data if a device driver is operable to receive the interaction data from touchpad 128. In another example, EC 212 may process the interaction data if data from touchpad 128 can be transformed.

In one or more embodiments, processing the interaction data from touchpad 128 may include transforming the interaction data. For example, EC 212 may transform the interaction data from a first bus protocol to a second bus protocol. For instance, EC 212 may transform the interaction data from a first protocol utilized by bus 222 to a second protocol utilized by bus 220.

In one or more embodiments, EC 212 may transform the interaction data from a first data format to a second data format, different from the first data format. For example, EC 212 may transform the interaction data from touchpad 128 to interaction data associated with a PS/2 interface and/or device. In one instance, the interaction data may include horizontal and vertical data (e.g., X/Y data), and EC 212 may transform the horizontal and vertical data (e.g., X/Y data) from touchpad 128 to horizontal and vertical data associated with a PS/2 interface and/or device. In a second instance, the interaction data may include gesture data, and EC 212 may transform the gesture data to data associated with a PS/2 interface and/or device (e.g., transform two-finger drag gesture data to scroll wheel data associated with a PS/2 interface and/or device). In another instance, the interaction data may include button data (e.g., actuation(s) of one or more of buttons 130) to button data associated with a PS/2 interface and/or device.

At 440, EC 212 may provide the processed interaction data to a second bus. In one example, the second bus may be or include bus 220. For instance, EC 212 may provide the processed interaction data to the second bus via a protocol utilized by the second bus. In another example, EC 212 may provide the transformed data to the second bus via the second data format. For instance, EC 212 may provide data associated with a PS/2 interface and/or device to the second bus. In one or more embodiments, the method illustrated in FIG. 4 may be utilized multiple times for acquiring, processing, and/or utilizing additional interaction data.

Figure 5:
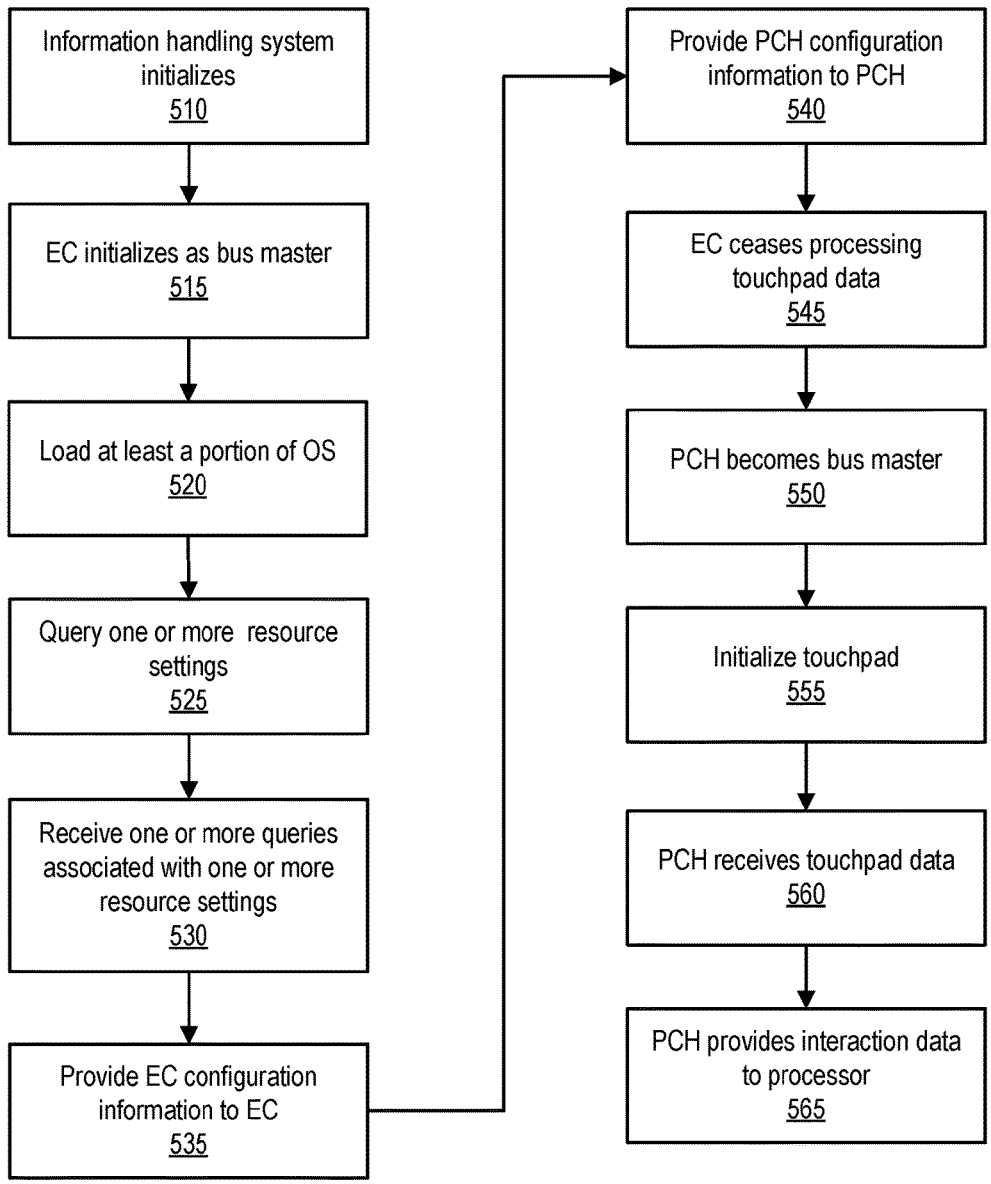
FIG. 5 illustrates a method of operating an information handling system, according to one or more embodiments.

Turning now to FIG. 5, a method of operating an information handling system is illustrated, according to one or more embodiments. At step 510, information handling system 100 may initialize. In one example, initializing information handling system 100 may include a power-on self-test (POST). In another example, initializing information handling system 100 may include booting information handling system 100. In one instance, booting information handling system 100 may include a cold boot of handling system 100. In another instance, booting information handling system 100 may include a warm boot and/or a warm reboot of handling system 100.

At 515, EC 212 may initialize as a bus master for a first bus. For example, the first bus may be or include bus 222. In one or more embodiments, when EC 212 is initialized as the bus master for the first bus, EC 212 may perform and/or provide the functionality associated with the method illustrated with reference to FIG. 4. At step 520, at least a portion of an OS may be loaded. For example, processor 114 may load the at least the portion of OS from storage 116. For instance, storage 116*b* may include persistent storage that may include storage media such as non-transitory computer-readable media that stores, for at least a period of time, data and instructions, such as the OS. In one or more embodiments, loading the at least the portion of OS may include loading and/or transferring one or more portions of the OS from one storage to another. For example, processor 114 may load and/or transfer one or more portions of the OS from storage 116*b* to storage 116*a*. For instance, storage 116*a* may include volatile memory such as RAM. In one or more embodiments, loading the at least the portion of OS may include executing one or more portions of the OS.

At step 525, one or more resource settings may be queried. For example, processor 114 may query one or more resource setting of information handling system 100. In one instance, processor 114 may execute a portion of the OS (e.g., a portion of the OS associated with touchpad 128) that may query one or more resource settings. In another instance, processor 114 may execute a device driver (e.g., a device driver associated with touchpad 128) that may query one or more resource settings. In one or more embodiments, querying the one or more resource settings may include utilizing an Advanced Configuration and Power Interface (ACPI). For example, a device driver, executed via processor 114, may query the ACPI layer to determine configuration information associated PCH 210, one or more buses (e.g., one or more of buses 220 and 222), and/or touchpad 128.

At step 530, one or more queries associated with one or more resource settings may be received. For example, processor 114 may receive the one or more queries associated with one or more resource settings. For instance, processor 114 may execute a portion of a system management basic input output (SMBIOS) to receive the one or more queries associated with one or more resource settings. In one or more embodiments, the SMBIOS may include one or more data structures and/or one or more processor-executable processes that may access the one or more data structures. For example, processor 114 may receive the one or more queries associated with one or more resource settings via one or more processor-executable processes that may access the one or more data structures.

In one or more embodiments, an ACPI implementation may include the SMBIOS, and the ACPI implementation may be modified and/or customized. For example, the ACPI implementation may be customized and/or modified to direct and/or permit processor 114 to execute processor instructions that may modify one or more behaviors of one or more of EC 212 and PCH 210, among others. In one instance, when a status of PCH 210, one or more buses (e.g., one or more of buses 220 and 222), and/or touchpad 128 is queried, processor 114 may be directed and/or permitted to execute processor instructions that may modify one or more behaviors of one or more of EC 212 and PCH 210, among others. In another instance, when a "_STA" or status process of the ACPI implementation (e.g., a status method of an ACPI_STA object) is executed via processor 114, processor 114 may be directed and/or permitted to execute processor instructions that may modify one or more behaviors of one or more of EC 212 and PCH 210, among others. In one or more embodiments, modifying one or more behaviors of one or more of EC 212 and PCH 210 may include providing configuration information to one or more of EC 212 and PCH 210, among others.

At step 535, embedded controller configuration information may be provided to EC 212. For example, processor 114 may provide control information to EC 212. For instance, the embedded controller configuration information, provided to EC 212, may configure and/or instruct EC 212 to cease performing and/or providing the functionality of the method described with reference to FIG. 4. At step 540, PCH configuration information may be provided to PCH 210. For example, processor 114 may provide control information to PCH 210. In one instance, the PCH configuration information, provided to PCH 210, may configure and/or instruct PCH 210 to become the bus master of bus 222. In another instance, the PCH configuration information, provided to PCH 210, may configure and/or instruct PCH 210 to initialize touchpad 128 and process interaction data associated with touchpad 128.

At step 545, EC 212 may cease processing interaction data associated with touchpad 128. In one or more embodiments, when or proximate to EC 212 ceasing processing interaction data associated with touchpad 128, EC 212 may cease being the bus master for bus 222. For example, EC 212 may cease being the bus master for bus 222 in response to and/or based on the embedded controller configuration information provided to EC 212. At step 550, PCH 210 may become the bus master of bus 222. For example, PCH 210 may become the bus master of bus 222 in response to and/or based on the PCH configuration information provided to PCH 210.

At step 555, touchpad 128 may be initialized. In one example, PCH 210 may initialize touchpad 128. In another example, processor 114 may execute a device driver that may initialize touchpad 128 via PCH 210. In one or more embodiments, touchpad 128 may be initialized for gesture utilization. For example, touchpad 128 may be initialized for additional or full gesture utilization.

At step 560, PCH 210 may receive interaction data associated with touchpad 128. For example, PCH 210 may receive the interaction data associated with touchpad 128 via bus 222. At 565, PCH 210 may provide interaction data associated with touchpad 128 to processor 114. In one or more embodiments, PCH 210 may provide interaction data associated with touchpad 128 to processor 114 via a bus or a point-to-point communication coupling. In one example, the bus may be different from buses 220 and 222. In another example, PCH 210 may provide interaction data associated with touchpad 128 to processor 114 via a peripheral component interconnect express (PCIe) communication coupling.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a processor;
   a memory communicatively coupled to the processor and that stores instructions executable by the processor;
   a first bus communicatively coupled to the processor;
   a second bus, different from the first bus, communicatively coupled to the processor;
   an embedded controller communicatively coupled to the first bus and communicatively coupled to the second bus; and
   wherein the embedded controller is configured to:
      receive, via the first bus, interaction data associated with a pointing device that is communicatively coupled to the information handling system;
      transform the interaction data from a first data format into a second data format, different from the first data format; and
      provide the interaction data to the second bus via the second data format;
   wherein the instructions, when executed by the processor, cause the information handling system to:
      query at least one resource associated with the pointing device; and
      in response to querying the at least one resource associated with the pointing device, provide embedded controller configuration information to the embedded controller; and
   wherein the embedded controller is further configured to:

cease to provide the interaction data to the second bus based on the embedded controller configuration information.

2. The information handling system of claim 1, wherein the second data format is a PS/2 format.

3. The information handling system of claim 1, wherein the embedded controller is further configured to:
receive a signal that indicates that the interaction data is available via the first bus; and
query the pointing device for the interaction data.

4. The information handling system of claim 1, further comprising:
a platform controller hub (PCH) communicatively coupled to the processor;
wherein the instructions further cause the information handling system to:
in response to querying the at least one resource associated with the pointing device, provide PCH configuration information to the PCH; and
wherein the PCH is configured to receive, via the first bus, additional interaction data associated with the pointing device and provides the additional interaction data to the processor.

5. The information handling system of claim 4,
wherein the embedded controller is further configured to:
cease operating as a bus master of the first bus based on the embedded controller configuration information; and
wherein the PCH is further configured to:
operate as the bus master of the first bus based on the PCH configuration information.

6. The information handling system of claim 1, wherein the first bus includes an inter-integrated circuit ($I^2C$) bus.

7. The information handling system of claim 6, wherein the at least one resource associated with the pointing device includes the $I^2C$ bus.

8. The information handling system of claim 1, wherein the second bus includes at least one of a low pin count (LPC) bus and an enhanced serial peripheral interconnect (eSPI) bus.

9. The information handling system of claim 1, wherein the embedded controller is further configured to:
receive, via the first bus, additional interaction data associated with the pointing device;
determine that the additional interaction data cannot be transformed into the second data format; and
drop the additional interaction data.

10. The information handling system of claim 1, wherein the pointing device includes at least one of a mouse, a trackball, a touchpad, and a touchscreen.

11. A method of operating an information handling system, comprising:
an embedded controller of the information handling system receiving, via a first bus of the information handling system, interaction data associated with a pointing device communicatively coupled to the information handling system;
the embedded controller transforming the interaction data from a first data format into a second data format, different from the first data format;
the embedded controller providing the interaction data to a second bus, different from the first bus, of the information handling system via the second data format;
querying at least one resource associated with the pointing device;
in response to the querying the at least one resource associated with the pointing device, providing embedded controller configuration information to the embedded controller; and
the embedded controller, based on the embedded controller configuration information, ceasing to provided the interaction data to the second bus.

12. The method of claim 11, wherein the second data format is a PS/2 format.

13. The method of claim 11, further comprising:
the embedded controller receiving a signal that indicates that the interaction data is available via the first bus; and
the embedded controller querying the pointing device for the interaction data.

14. The method of claim 11, further comprising:
in response to the querying the at least one resource associated with the pointing device, providing platform controller hub (PCH) configuration information to a PCH of the information handling system;
the PCH receiving, via the first bus, additional interaction data associated with the pointing device; and
the PCH providing the additional interaction data to a processor of the information handling system.

15. The method of claim 14, further comprising:
the embedded controller, based on the embedded controller configuration information, ceasing to operate as a bus master of the first bus; and
the PCH, based on the PCH configuration information, operating as the bus master of the first bus.

16. The method of claim 11, wherein the first bus includes an inter-integrated circuit ($I^2C$) bus.

17. The method of claim 16, wherein the at least one resource associated with the pointing device includes the $I^2C$ bus.

18. The method of claim 11, wherein the second bus includes at least one of a low pin count (LPC) bus and an enhanced serial peripheral interconnect (eSPI) bus.

19. The method of claim 11, further comprising:
the embedded controller receiving, via the first bus, additional interaction data associated with the pointing device;
the embedded controller determining that the additional interaction data cannot be transformed into the second data format; and
the embedded controller dropping the additional interaction data.

20. The method of claim 11, wherein the pointing device includes at least one of a mouse, a trackball, a touchpad, and a touchscreen.

* * * * *